(12) United States Patent
Murthy et al.

(10) Patent No.: US 7,833,415 B2
(45) Date of Patent: Nov. 16, 2010

(54) METHOD FOR TREATING RAW SLUDGE INCLUDING A SIMULTANEOUS OR PULSED AEROBIC/ANOXIC DIGESTION PROCESS

(75) Inventors: Sudhir N. Murthy, Washington, DC (US); John T. Novak, Blacksburg, VA (US); Walter F. Bailey, Jr., Washington, DC (US); Glen T. Daigger, Parker, CO (US); Perry Schafer, Sacramento, CA (US); Christopher Peot, Washington, DC (US)

(73) Assignee: D.C. Water & Sewer Authority, Washington, DC (US)

( * ) Notice: Subject to any disclaimer, the term of this patent is extended or adjusted under 35 U.S.C. 154(b) by 527 days.

(21) Appl. No.: 11/585,842

(22) Filed: Oct. 25, 2006

(65) Prior Publication Data
US 2007/0102353 A1 May 10, 2007

Related U.S. Application Data

(60) Provisional application No. 60/730,027, filed on Oct. 26, 2005.

(51) Int. Cl.
*C02F 3/00* (2006.01)
(52) U.S. Cl. .................................................. 210/605
(58) Field of Classification Search .................. 210/605, 210/620, 621, 623, 626
See application file for complete search history.

(56) References Cited

U.S. PATENT DOCUMENTS

| | | | | |
|---|---|---|---|---|
| 624,985 | A * | 5/1899 | Scott-Moncrieff | 210/605 |
| 3,345,288 | A * | 10/1967 | Sontheimer | 210/609 |
| 4,056,465 | A * | 11/1977 | Spector | 210/605 |
| 4,134,830 | A * | 1/1979 | Skogman et al. | 210/603 |
| 4,246,099 | A | 1/1981 | Gould | |
| 4,271,026 | A * | 6/1981 | Chen et al. | 210/605 |
| 4,315,821 | A * | 2/1982 | Climenhage | 210/605 |
| 4,461,708 | A * | 7/1984 | Hakulinen et al. | 210/605 |
| 4,488,968 | A * | 12/1984 | Hong et al. | 210/605 |
| 4,559,142 | A * | 12/1985 | Morper | 210/607 |
| 4,800,021 | A * | 1/1989 | Desbos | 210/605 |
| 4,915,841 | A * | 4/1990 | Lagana' et al. | 210/605 |
| 4,919,815 | A * | 4/1990 | Copa et al. | 210/603 |
| 5,196,111 | A * | 3/1993 | Nicol et al. | 210/96.1 |
| 5,223,140 | A * | 6/1993 | Rutherford et al. | 210/605 |
| 5,266,200 | A * | 11/1993 | Reid | 210/605 |
| 5,540,839 | A * | 7/1996 | Pirt | 210/612 |

(Continued)

OTHER PUBLICATIONS

Science Dictionary definition of "raw sludge," http://www.science-dictionary.com/definition/raw-sludge.html, downloaded May 23, 2010.*

(Continued)

*Primary Examiner*—Chester T Barry
(74) *Attorney, Agent, or Firm*—Dickstein Shapiro LLP

(57) ABSTRACT

An improved process for sludge treatment includes anaerobic digestion followed by post-mesophilic aerobic and/or anoxic digestion. The first anaerobic step may be performed under either mesophilic or thermophilic conditions. The subsequent aerobic/anoxic digestion may be performed using either simultaneous, sequential or pulsed aerobic and anoxic conditions. An apparatus for performing the improved sludge treatment may be one digester for performing the anaerobic followed by aerobic/anoxic digestion. Alternatively, the system for performing the improved sludge treatment techniques may be at least two digest reactors.

15 Claims, 4 Drawing Sheets

U.S. PATENT DOCUMENTS

| | | | | |
|---|---|---|---|---|
| 5,543,051 | A * | 8/1996 | Harris | 210/605 |
| 5,601,719 | A | 2/1997 | Hawkins et al. | |
| 5,605,629 | A * | 2/1997 | Rogalla | 210/605 |
| 5,746,919 | A | 5/1998 | Dague | |
| 6,015,496 | A | 1/2000 | Khudenko | |
| 6,660,164 | B1 | 12/2003 | Stover | |
| 6,676,836 | B2 * | 1/2004 | Mandt | 210/605 |
| 6,685,834 | B1 | 2/2004 | Murthy et al. | |
| 6,719,903 | B1 | 4/2004 | Pressley et al. | |
| 6,730,224 | B2 | 5/2004 | Blackburn | |
| 6,936,170 | B2 * | 8/2005 | Shieh et al. | 210/630 |
| 7,172,699 | B1 * | 2/2007 | Trivedi et al. | 210/605 |
| 7,407,584 | B2 * | 8/2008 | Lemoine et al. | 210/614 |
| 7,422,688 | B2 * | 9/2008 | Ekeroth | 210/622 |
| 2003/0142301 | A1 * | 7/2003 | Coleman et al. | 356/301 |
| 2005/0028680 | A1 * | 2/2005 | Thompson et al. | 99/455 |
| 2005/0087480 | A1 * | 4/2005 | Park et al. | 210/96.1 |
| 2005/0145566 | A1 * | 7/2005 | Haase et al. | 210/620 |

OTHER PUBLICATIONS

Jeris, John S., et al., "Determining the Stability of Treated Municipal Sludges," EPA, 1985, EPA-600/2/85-001, pp. 129,132.

Mason, C.A., et al., "Aerobic Thermophilic Waste Sludge Treatment," Water Science Technology, 1992, vol. 25, No. 1; pp. 113-118.

Messenger, J.R., et al., "Oxygen Utilization Rate as a Control Parameter for the Aerobic Stage in Dual Digestion," Water Science Technology, 1990, vol. 22, No. 12; pp. 217-227.

Ranade, Bipin. R., et al., "Microbial Massacre," Environmental Protection., Jul./Aug. 2004, pp. 1-4.

Yi, Y.-S., et al., "Gas analysis reveals novel aerobic deammonification in themophilic aerobic digestion," Water Science and Technology, 2003, vol. 47, No. 10; pp. 131-138.

Ros, M., et al., "Two-Stage Thermophilic Anaerobic-Aerobic Digestion of Waste-Activated Sludge," Environmental Eng. Sci., 2004, vol. 21, No. 5; pp. 617-626.

Gavala, Hariklia N., et al., "Mesophilic and thermophilic anaerobic digestion of primary and secondary sludge. Effect of pretreatment at elevated temperature," Water Research, 2003, vol. 37; pp. 4561-4572.

Fothergill, S., et al., "VFA Production In Thermophilic Aerobic Digestion of Municipal Sludges," Journal of Env: Eng., May 2000; pp. 389-396.

Murthy, Sudhir, et al., "Mesophilic Aeration of Autothermal Thermophilic Aerobically Digested Biosolids to Improve Plant Operations," Water. Env. Research, 2000, vol. 72, No. 4; pp. 476-483.

Salem, S., et al., "Bio-Augmentation by Nitrification with Return Sludge," Water Research, 2003, vol. 37, No. 8; pp. 1794-1804.

Kumar, P., et al., "Upgrading Wastewater Treatment by Water Hyacinth in Developing Countries," Water Science Technology, 1990, vol. 22, No. 7/8; pp. 153-160.

Ferran, et al., "The two phase anaerobic digestion process: sludge stabilization and pathogens reduction," Water Science and Technology, 2000, vol. 42, No. 9, pp. 41-47.

Chen, et al, "Distribution and change of microbial activity in combined UASB and AFB reactors for wastewater treatment," Bioprocess and Biosystems Engineering, Apr. 2000, vol. 4, p. 1615-7591. Abstract only.

* cited by examiner

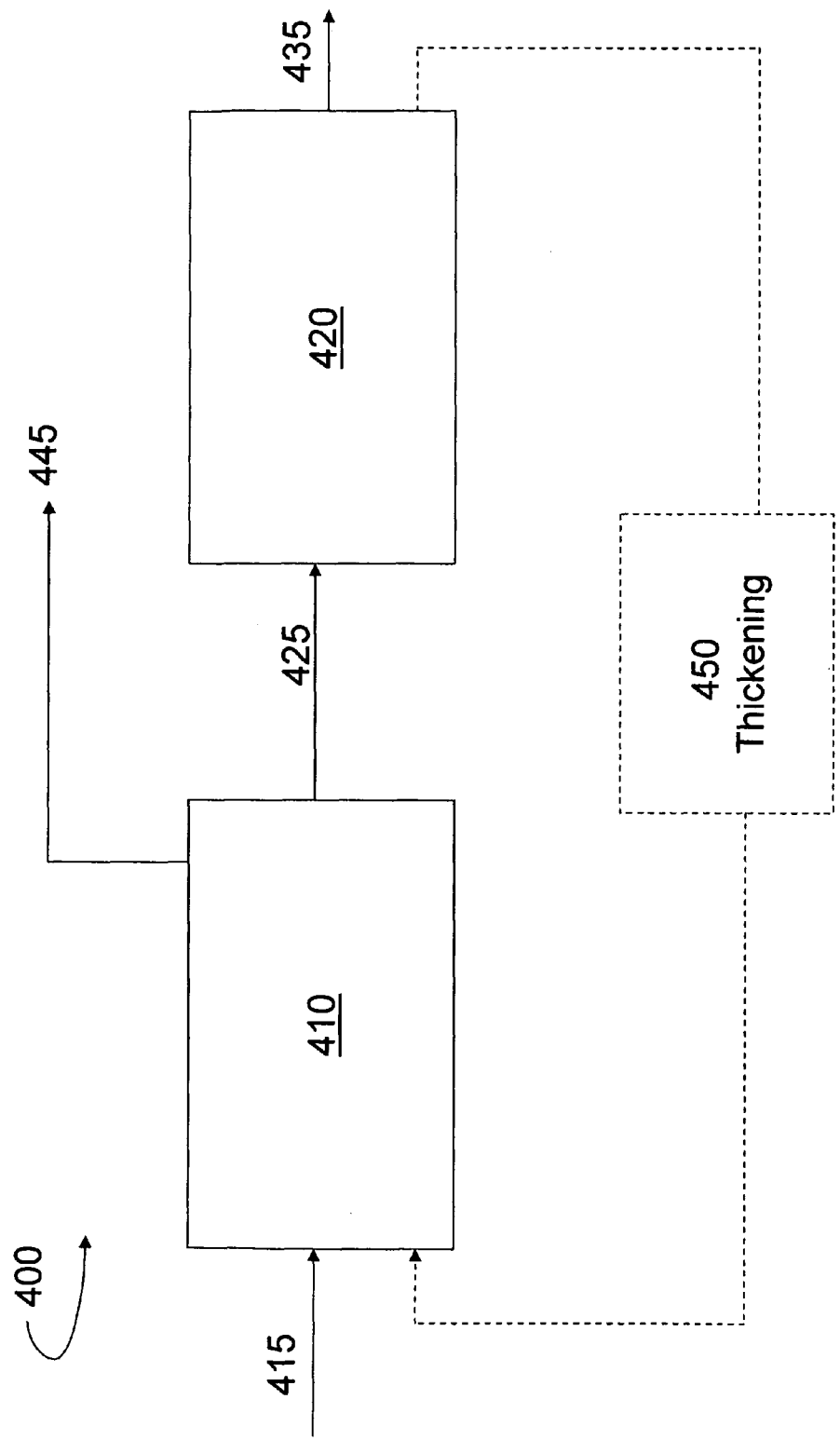

METHOD FOR TREATING RAW SLUDGE INCLUDING A SIMULTANEOUS OR PULSED AEROBIC/ANOXIC DIGESTION PROCESS

CROSS REFERENCE TO RELATED APPLICATIONS

The present application claims priority to U.S. Provisional Patent Application Ser. No. 60/730,027, filed on Oct. 26, 2005, the disclosure of which is incorporated by reference in its entirety.

FIELD OF THE INVENTION

The present invention relates generally to wastewater treatment and in particular to the treatment of digest reject water.

BACKGROUND OF THE INVENTION

Anaerobic digestion is a common method for stabilization of sludges produced during wastewater treatment. The anaerobic digestion or stabilization of sludges can be conducted under thermophilic or mesophilic conditions in a batch or a flow-through vessel, where anaerobic conditions are fostered to encourage fermentation and methanogenesis in the sludge biomass. The result is a decrease and removal of volatile solids that can cause putrefaction.

One example of a sludge digestion process is disclosed in U.S. Pat. No. 6,660,164 to Stover. In this patent, a one-step aerobic thermophilic process is described for treatment of waste streams. Other known treatment processes, such as that disclosed in U.S. Pat. No. 4,246,099 to Gould et al. The sludge treatment techniques discussed in that patent is a two-step process. In a first step, sludge is aerobically digested at a temperature from 35° C. to 75° C. Next, the sludge is anaerobically digested, preferably at a lower temperature.

Sludge treatments, like that described above, may consist of either a one-step treatment or a process that includes digestion of sludge under single-stage aerobic, single or multi-stage anaerobic or two-stage aerobic, followed by anaerobic conditions. However, these processes have several disadvantages:

1. Need for low nitrogen recycles. For a facility practicing nitrogen removal, the concentrated ammonia-nitrogen fraction in the reject liquor from anaerobic digestion needs to be treated either in a separate sidestream process or within the mainstream plant configuration, thus consuming significant capacity and operating expense (chemicals and aeration).

2. Need for improved volatile solids destruction. A decrease in volatile solids can reduce putrefaction and overall solids inventory (sludge minimization). Although anaerobic digestion can destroy volatile solids by as much as 50%, subsequent to anaerobic digestion, a significant fraction (a similar 50%) of volatile solids remain undigested. It is believed by the inventors that this undegraded volatile fraction is either inert or not accessible under anaerobic conditions. A further reduction in volatile solids can reduce putrefaction and reduce biosolids inventories (sludge minimization).

3. Need for improved dewatering. The biosolids from anaerobic digestion can consume considerable polymer demand during dewatering and produce variable cakes solids. A reduction in polymer demand and improvement to cake solids (sludge minimization) will benefit a facility by reducing operating costs.

4. Need for biosolids product quality improvements. Land application is an environmentally friendly, viable means of biosolids management and results in the recycling of nutrients and organics and thereby benefiting the soil for agriculture or reclamation. For many wastewater treatment plants in the United States, this viability is at a risk because of environmental pressures that result in a need to improve product quality-specifically reducing biosolids odors and treatment of endocrine disrupting and other trace chemicals. Reduction in odors and treatment of endocrine disrupting and other trace chemicals will improve product quality, marketability, reduce overall biosolids program risk, and increase the viability of the land application program.

Accordingly, there is a need and desire for a sludge processing and stabilization process and system that overcomes these disadvantages associated with the conventional wastewater treatment processing techniques.

SUMMARY OF THE INVENTION

The present invention, as illustrated in the various exemplary embodiments, includes an efficient process for sludge treatment. In a first step, raw sludge is input to anaerobic digester, which can be either a batch or continuous flow digester. This anaerobic step may be performed under either mesophilic and/or thermophilic conditions. Thereafter, the sludge is treated in a post-mesophilic aerobic/anoxic digester. This step can be performed under either single or multi-stage mesophilic and/or thermophilic conditions.

BRIEF DESCRIPTION OF THE DRAWINGS

The foregoing and other aspects of the invention will be better understood from the following detailed description of the invention, which is provided in connection with the accompanying drawings, in which:

FIG. 4 is a block diagram of a second exemplary embodiment of the process of FIG. 1.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that changes may be made without departing from the spirit and scope of the present invention. The progression and details of the processing steps described are exemplary of embodiments of the invention; however, the invention is not limited to the described embodiments set forth herein and may be altered from the description, with the exception of steps necessarily occurring in a certain order.

Figure 1:
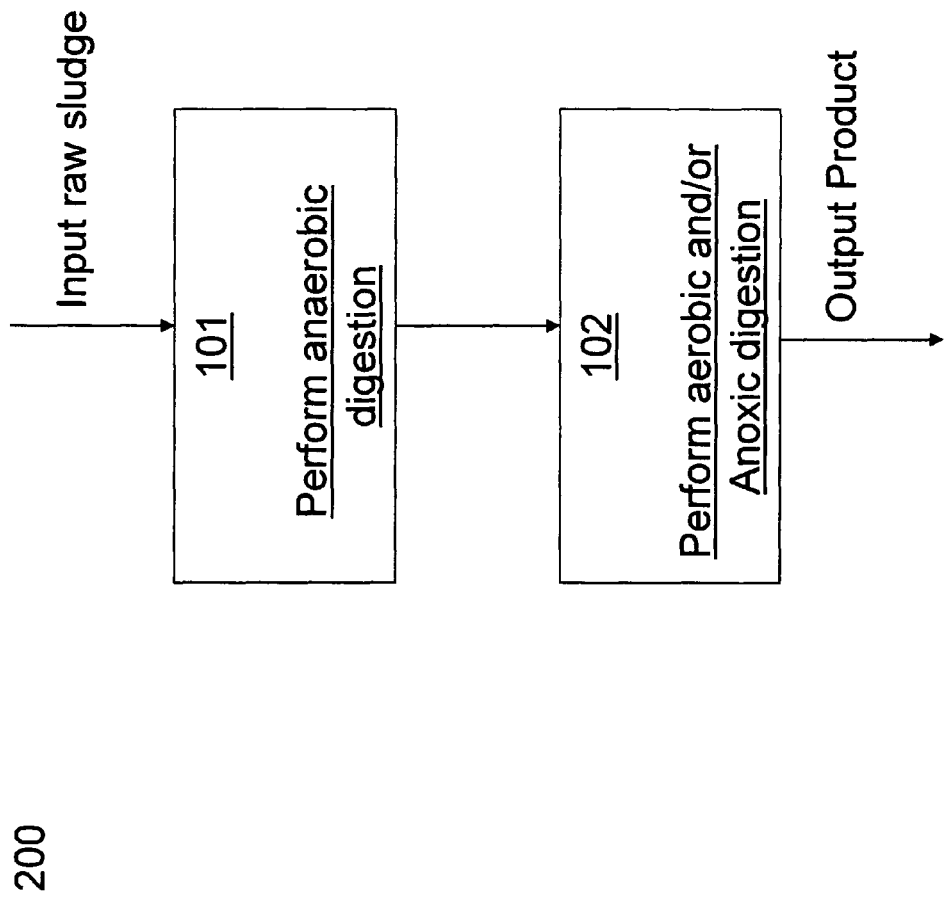
FIG. 1 is a flow chart diagram of a portion of a wastewater treatment process in accordance with the invention.
Figure 3:
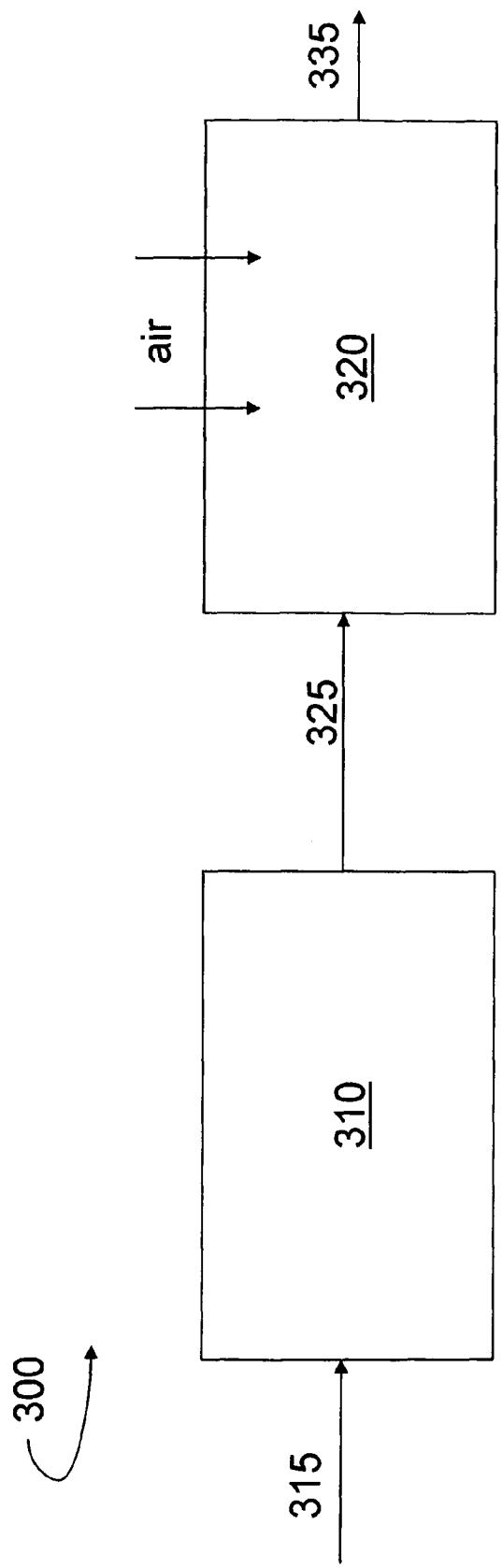
FIG. 3 is a block diagram of a first exemplary embodiment of the process of FIG. 1.

Now, referring to the drawings where like numerals represent like elements the invention, FIG. 1 illustrates a block diagram depicting a sludge treatment method 200 in accordance with the invention. This two-step method 200 includes a post-mesophilic aerobic and/or anoxic digestion 102 subsequent to mesophilic or thermophilic anaerobic digestion 101 performed on raw sludge. Two exemplary processes 300, 400 utilizing this two-step method 200 are shown in FIGS. 3 and 4 and discussed in more detail below.

Figure 2:
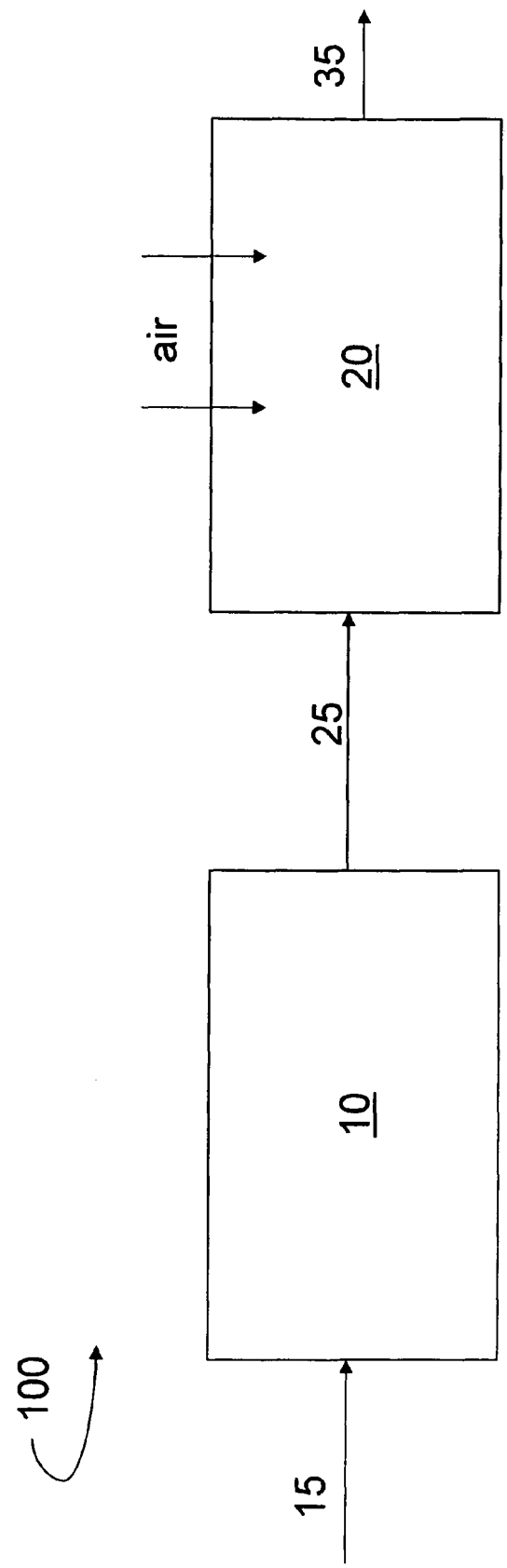
FIG. 2 is a block diagram of a wastewater treatment system in accordance with the invention.

With reference to FIG. 2, a first aspect of this invention is to provide an apparatus 100 for performing a two-step sludge digestion, such as the exemplary method 200 depicted in FIG. 1. For example, apparatus 100 can perform simultaneous, sequential or pulsed aerobic/anoxic digestion, of mesophilic or thermophilic anaerobically digested biosolids, as a polishing step to remove nitrogen from the biosolids. For example, apparatus 100 consists of a bioreactor 10 followed by bioreactor 20 that performs a polishing step of simultaneous, sequential or pulsed aerobic/anoxic digestion. The bioreactor is operated for a sufficient solids retention time of between 2 and 15 days at a temperature between 20° C. and 40° C. and with sufficient air to encourage autotrophic nitrification and denitrification either simultaneously, sequentially, or in a pulsed mode, as described in more detail below. No external carbonaceous substrate such as methanol is required and the volatile solids remaining after anaerobic digestion provides carbon requirements for denitrification.

The second aspect of the invention is to minimize sludge by producing additional volatile solids destruction during digestion in a two-step digestion process that cannot be achieved by anaerobic digestion alone. The two steps consisting of anaerobic bioreactor 10 and anoxic/aerobic bioreactor 20 achieves this additional volatile solids destruction by providing niche environmental conditions for degradation of substrates.

In either configuration, the first anaerobic digestion step 101 is followed by a mesophilic aerobic digestion step 102. In accordance with a preferred embodiment of the invention, the first anaerobic digestion step 101 has a solids retention time of between 2 and 25 days, and the mesophilic aerobic digestion step 102 has a solids retention time within the range of about 2 and about 15 days. It should be understood that the total process SRT should be approximately fifteen days average. Thus, if there is a smaller SRT in the anaerobic step, it needs to be made up with a larger SRT in the aerobic step, and vice-versa. In general, a greater SRT results in more thorough treatment.

As an example, if the SRT of the anaerobic step is greater than ten days, the optimum aerobic SRT for volatile solids destruction and nitrogen removal can be accomplished within the range of about 2-6 days. The dewatering, endocrine disrupter, trace pollutants and biosolids odor improvements would be optimized at a midrange SRT within the range of about 4-10 days. For an anaerobic step that has an SRT of less than ten days, the optimum aerobic SRT for nitrogen removal is optimized still within the range of about 2-6 days. For dewatering, biosolids destruction, endocrine disruption, and minimizing trace pollutants and odor, the optimum aerobic SRT is within the range of about 4-15 days.

In accordance with the invention, for the first thermophilic or mesophilic anaerobic step 101, the solids retention time can be substantially decreased from a conventional time of 20-25 days to as low as 2 days, and the remaining digestion is accommodated in the second aerobic step 102, having a retention time of approximately 15 days. In this way, the first anaerobic step 101 serves as a main digestion step followed by a polishing aerobic digestion step 102. Either operating mode enhances overall volatile solids destruction over and above that achieved by a single step mesophilic or thermophilic anaerobic digestion process. This aspect of the invention will reduce putrefaction and odor production potential in biosolids by effectively destroying precursors (such as protein) for odor production and by stimulating aerobic conditions that will discourage the growth or stimulation of odor producing microorganisms.

In a third aspect of the invention, the mesophilic aerobic digestion step 102 removes bound water and colloidal protein and polysaccharide in the biosolids in a manner to improve cake solids content (sludge minimization) and reduce polymer dose during dewatering operations.

In a fourth aspect of the invention, endocrine disrupting compounds and other trace pollutants are degraded by the alternating anaerobic and aerobic step in a manner not achieved in one step alone. The aerobic step should preferably proceed to nitrification to degrade these chemicals. Depending on the pollutant intended for destruction, the anaerobic step 101 solids retention time can vary between 2 and 25 days and the aerobic digestion step 102 can vary between 2 and 15 days solids retention time.

The simultaneous aerobic/anoxic digestion apparatus 20 is differentiated from an aeration apparatus that merely serves to 'freshen' digested biosolids. The term aerobic refers to developing populations that operate under aerobic conditions using oxygen as an electron acceptor and the term anoxic refers to developing denitrifying populations using nitrate or nitrite as an electron acceptor. The term aeration is the addition of air to the process with an expressed purpose of creating conditions for using oxygen as an electron acceptor. Developing populations of these aerobic and/or denitrifying organisms is necessary for addressing above needs. Sufficient oxygen transfer is required to convert anaerobic biosolids to aerobic product, produce nitrite and to reduce odors, and to simultaneously promote anoxic microzones in the biomass to promote simultaneous denitrification.

Accordingly, simultaneous aerobic/anoxic digestion is preferred over conventional digestion techniques. Simultaneous aerobic/anoxic conditions are achieved by modulating the air, such that dissolved oxygen and pH in the process simultaneously achieve niche aerobic and anoxic environments. Alternately, a pulsed aerobic-anoxic step is employed to achieve nitrification and denitrification. This pulsed condition is achieved by cycling air on and off to achieve the aerobic and anoxic conditions within a single reactor. Sequential aerobic and anoxic conditions is another alternative, which requires two separate reactors, one for each digestion process.

The relative benefits of these three alternative processes depends on the size of the plant and the equipment, such as reactors, that are available. The simultaneous aerobic/anoxic digestion may be a slightly preferred embodiment because it minimizes the operational issues and can be operated in a single reactor. However, if a system implementing the present invention had two smaller digest reactors, it would clearly be more beneficial to utilize the sequential aerobic/anoxic digestion. Defining other preferred parameters for a system, such as a volume of input air, the dissolved oxygen content, pH, etc., are dependant on the sludge input, and should thus be adjusted to the needs of a particular system.

FIGS. 3 and 4 depict first and second exemplary embodiments 300 and 400 for carrying out the process 100 (FIG. 1) of the invention and having the benefits discussed above. In both exemplary processes, in a first anaerobic step 310 or 410, a minimum SRT of 2 days is necessary to encourage acidification reactions by fermenting populations. A maximum SRT of 25 days is proposed to achieve stable mesophilic or thermophilic anaerobic digestion. The temperature should be maintained between 35 and about 60° C.

In the aerobic step 320 or 420, a minimum SRT of 2 days is necessary to prevent washout of nitrifying (autotrophic)

populations that result in the formation of nitrite. In a preferred embodiment, the SRT is within the range of about 3 to about 6 days. The temperature at the aerobic step 320, 420 should be between 20 and about 40° C.

For these processes 300, 400, sufficient oxygen transfer is required to covert anaerobic biosolids to aerobic product, produce nitrite and to reduce odors, remove endocrine disrupting and trace chemicals, and to simultaneously promote anoxic micro zones in the biomass to promote simultaneous denitrification. Alternatively, a sequential or pulsed aerobic-anoxic step is employed to achieve nitrification and denitrification.

With respect to the exemplary process 400 shown in FIG. 4, recycling of sludge is an option that could be employed to expose part or all of the sludge to additional anaerobic and/or aerobic digestion. Specifically, not only is product 435 output after the mesophilic aerobic step 420, but also, sludge can be recycled through the process 400 and input back before the anaerobic digestion step 410. The sludge may also be recycled through a thickening process 450 to increase sludge concentration and to reduce volume occupied by the sludge. The recycle rate can be anywhere within the range of 0-100% of the flow rate for the initial flow of input 415. The recycling allows exposure to alternating anaerobic and aerobic digestion, thus producing additional volatile solids destruction. The recycling of sludge also allows for anaerobic digestion to be the last step for the digested biosolids product, if desired. Anaerobic digestion (at step 410) is the preferred final step if long-term anaerobic storage of biosolids product 445 is desired.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Additionally, any modifications, though presently unforeseeable, of the present invention that come within the spirit and scope of the following claims should be considered part of the present invention.

What is claimed as new and desired to be protected by Letters Patent of the United States is:

1. A process for the treatment of raw sludge comprising:
   inputting raw sludge into a digester;
   performing anaerobic digestion on the raw sludge; and
   subsequently performing mesophilic aerobic digestion and anoxic digestion on the anaerobically digested sludge, wherein the mesophilic aerobic digestion and the anoxic digestion occur within a single process tank.

2. The process of claim 1, wherein the act of performing anaerobic digestion is performed at least in part under mesophilic conditions.

3. The process of claim 1, wherein the act of performing anaerobic digestion is performed at least in part under thermophilic conditions.

4. The process of claim 1, wherein the act of performing anaerobic digestion has a solids retention time in the range of about 2 to about 25 days.

5. The process of claim 4, wherein the act of performing anaerobic digestion is performed at a temperature in the range of about 35 to about 60 degrees Celsius.

6. The process of claim 1, wherein the step of performing mesophilic aerobic digestion and anoxic digestion comprises simultaneous aerobic digestion and anoxic digestion.

7. The process of claim 1, wherein the step of performing mesophilic aerobic digestion and anoxic digestion comprises pulsing between aerobic and anoxic conditions within the single process tank.

8. The process of claim 1, wherein the step of performing mesophilic aerobic digestion and anoxic digestion comprises a solids retention time greater than two days.

9. The process of claim 8, wherein the step of performing mesophilic aerobic digestion and anoxic digestion are performed at a temperature in the range of about 20 to about 40 degrees Celsius.

10. The process of claim 1, further comprising recirculating at least a portion of the remaining sludge after the step of performing mesophilic aerobic digestion and anoxic digestion.

11. The process of claim 10, wherein the recirculated sludge is input to a stream prior to the anaerobic digestion step.

12. The process of claim 1, further comprising the act of thickening the aerobically/anoxically digested sludge to increase the sludge concentration.

13. The process of claim 1, further comprising performing anaerobic digestion on an output of the step of performing mesophilic aerobic digestion and anoxic digestion.

14. The process of claim 4, further comprising the act of thickening the aerobically/anoxically digested sludge to increase the sludge concentration.

15. The process of claim 8, further comprising the act of thickening the aerobically/anoxically digested sludge to increase the sludge concentration.

\* \* \* \* \*